Figure 1:
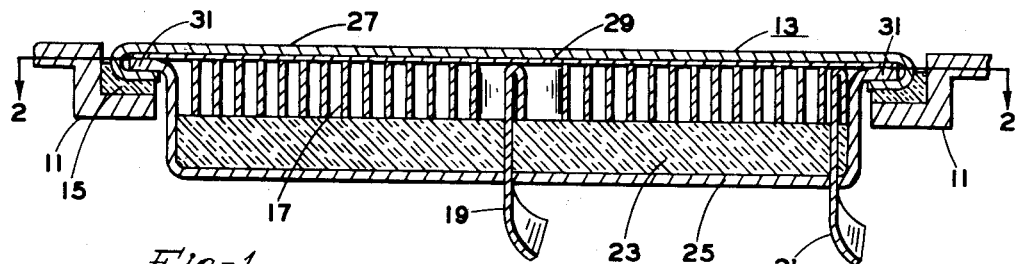

Oct. 9, 1951  C. M. OSTERHELD  2,570,975
ELECTRIC HEATING ELEMENT
Filed July 27, 1946  3 Sheets-Sheet 1

INVENTOR.
CLARK M. OSTERHELD
BY
ATTY

Oct. 9, 1951  C. M. OSTERHELD  2,570,975
ELECTRIC HEATING ELEMENT
Filed July 27, 1946  3 Sheets-Sheet 2
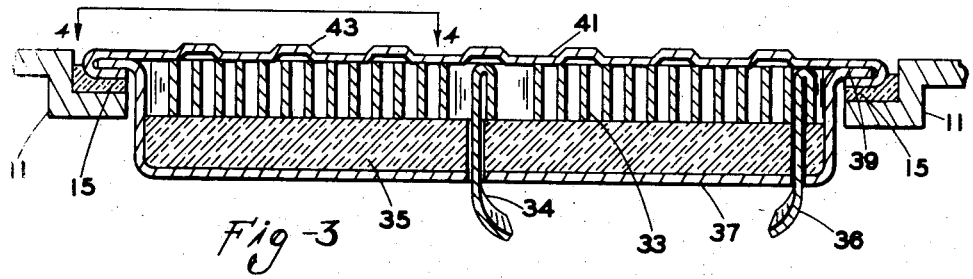
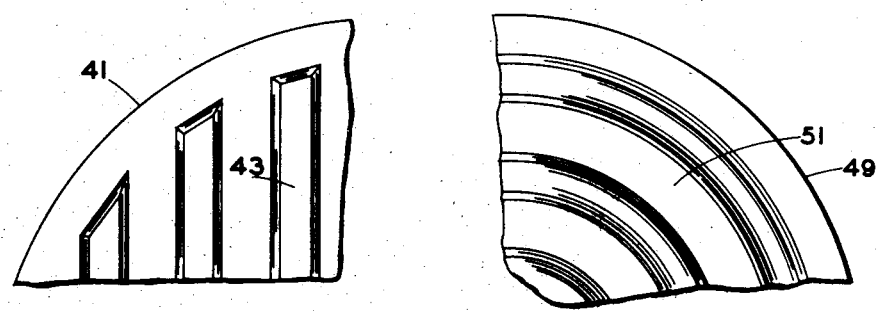
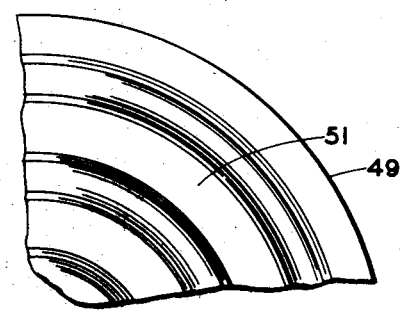
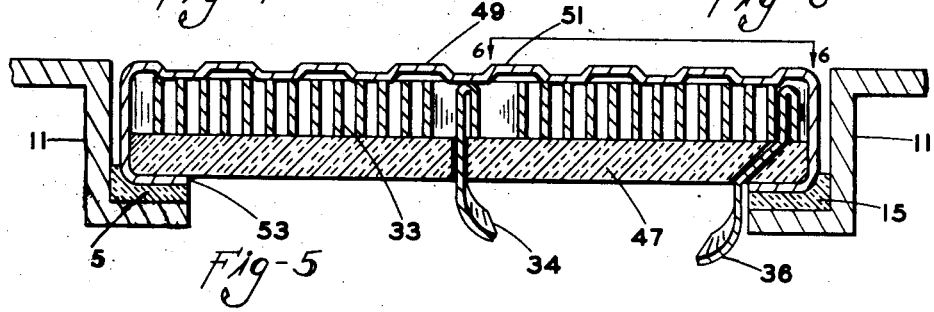
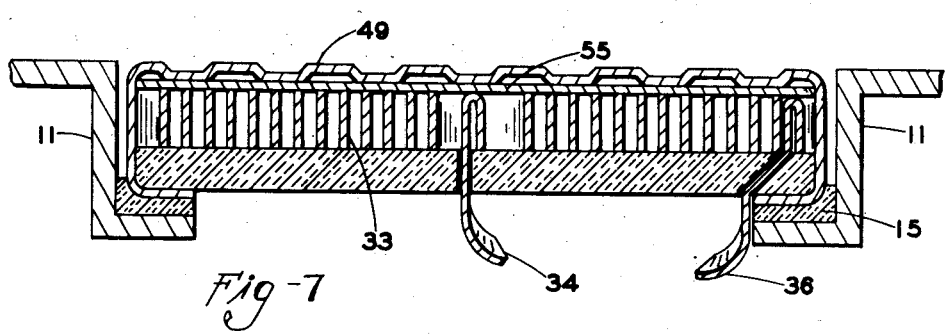
INVENTOR.
CLARK M. OSTERHELD
BY
ATTY Oct. 9, 1951          C. M. OSTERHELD          2,570,975
ELECTRIC HEATING ELEMENT
Filed July 27, 1946          3 Sheets-Sheet 3
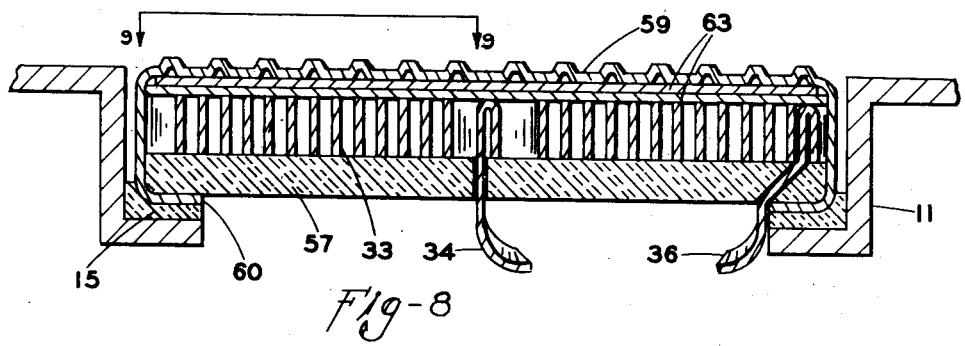
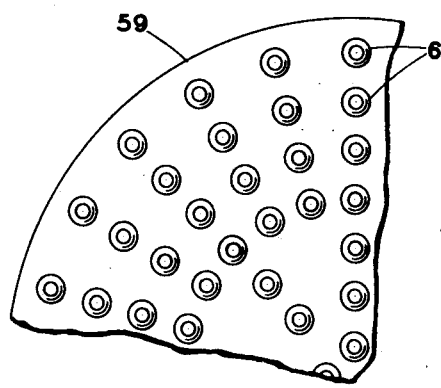
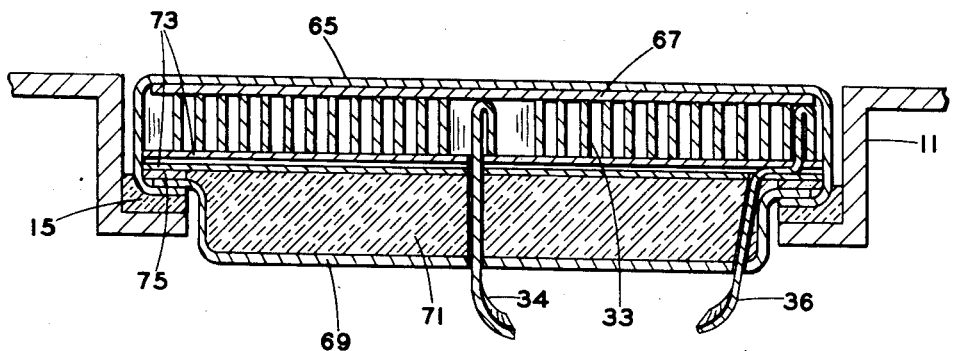
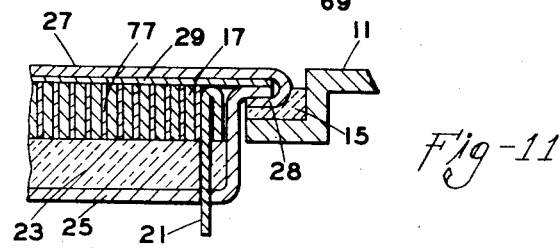
INVENTOR.
CLARK M. OSTERHELD
BY Patented Oct. 9, 1951

2,570,975

UNITED STATES PATENT OFFICE 2,570,975

ELECTRIC HEATING ELEMENT

Clark M. Osterheld, Stoughton, Wis., assignor to McGraw Electric Company, Elgin, Ill., a corporation of Delaware Application July 27, 1946, Serial No. 686,754

1 Claim. (Cl. 219—37)

My invention relates to electric heating units and particularly to encased electric heating units, particularly for cooking purposes.

An object of my invention is to provide an encased electric heating unit of new design.

Another object of my invention is to provide an electric heating unit having a metallic resistor provided with integral electric-insulation thereon, of a minimum thickness.

Another object of my invention is to provide an electric heating unit that shall be provided with an upper cover member of high heat conductivity and lower cover means of low heat conductivity.

Other objects of my invention will either be apparent from a description of several forms of devices embodying my invention or will be set forth in the course of such description and particularly in the appended claim.

Figure 2:
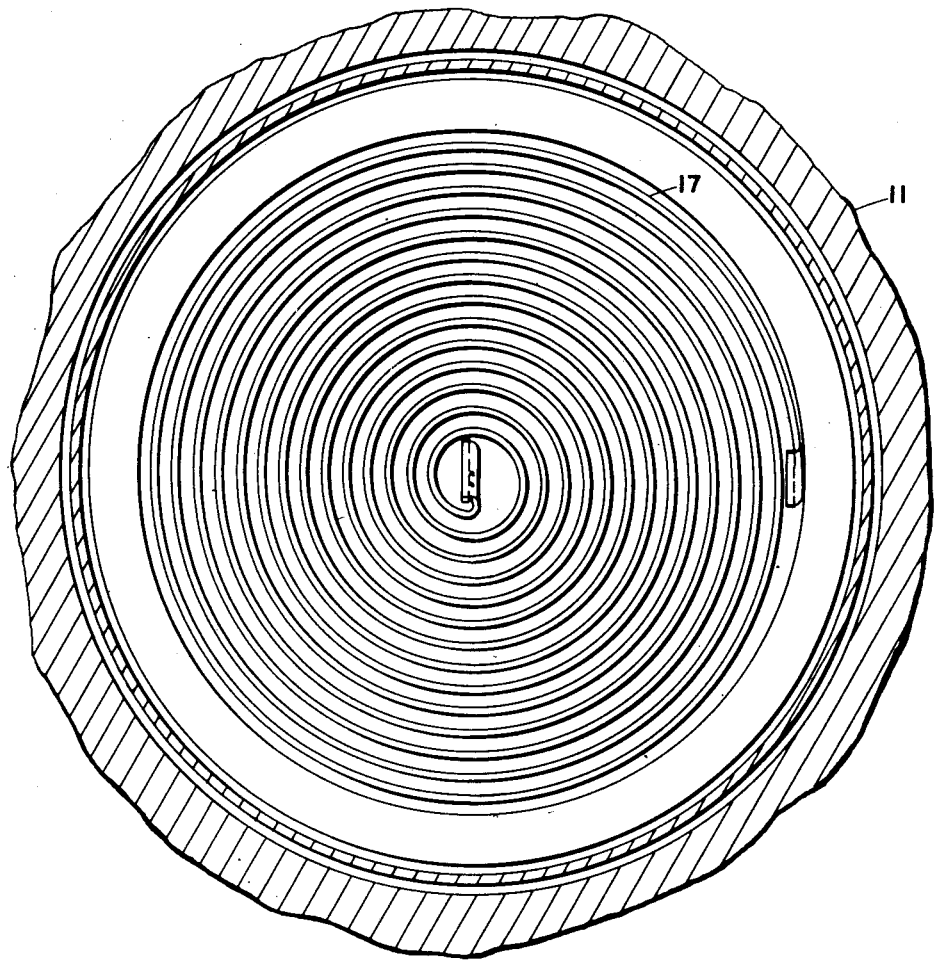

In the drawings,

Figure 1 is a view in vertical section through an electric heating unit embodying my invention, Fig. 2 is a view in horizontal section therethrough taken on the line 2—2 of Fig. 1, Fig. 3 is a view in vertical section through a modification of the device shown in Fig. 1, Fig. 4 is a fragmentary top plan view thereof taken on the line 4—4 of Fig. 3, Fig. 5 is a view in vertical section through another modification, Fig. 6 is a fragmentary top plan view thereof taken on the line 6—6 of Fig. 5, Fig. 7 is a view in vertical section through still another modification, Fig. 8 is a view in vertical section through still another modification, Fig. 9 is a fragmentary top plan view thereof taken on the line 9—9 of Fig. 8, Fig. 10 is a view in vertical section through still another modification of device embodying my invention, and Fig. 11 is a view in fragmentary section of a still further modification of a heating unit embodying my invention.

Referring first of all to Figs. 1 and 2 of the drawings, I have there shown a range body 11 with which a heating unit 13 embodying my invention is operatively associated.

Heat insulating means 15 of annular shape is adapted to prevent direct contact between the heating unit 13 and the range 11. This heat insulation may be of any suitable or desired solid kind such as asbestos lumber.

The heating unit 13 embodies a metallic resistor strip 17 which is wound flat-wise into helical shape and is provided with two depending terminal extensions 19 and 21 to permit of connecting it to a suitable source of supply of electric energy. While I have shown the individual turns of the resistor strip 17 as being spaced apart, I do not desire to be limited thereto since the individual turns may be in close engagement with each other.

The metallic resistor strip 17 may be of a suitable metal such as now used for resistors and it may also comprise a strip of aluminum, the thickness and the height of said strip being such as to give the proper resistance in order to obtain a desired current flow therethrough to give a certain desired wattage of the heating unit.

The entire outer surface of the strip 17 is covered by an inorganic, integral, heat-conducting, high-temperature resisting and electric-insulating anodic coating, the thickness of which is on the order of .001″. One method of providing such a coating of electric-insulating material is disclosed in Patent No. 1,526,127, although other methods and means for causing the resistance conductor to be covered with such a coating may be used.

The helically wound resistor strip 17 is adapted to rest upon a solid block 23 of electric- and heat-insulating material and this material may be asbestos lumber or Micalex. The block 23 of electric and particularly of heat-insulating material 23, is adapted to rest upon a dish-shaped supporting member 25 of metal which has a depth cooperating with the rest of the heating unit to support an upper flat cover plate 27 which shall be level with the top of the range. I provide a relatively thin sheet 29 which is preferably of aluminum and which has a thickness on the order of .015″ and which also is provided with an anodic coating on its upper and on its lower surface of the kind herein described as being provided on conductor 17.

The top plate 27 may be made of thicker material, for example, it may have a thickness on the order of .06″ and may also be made of aluminum although I do not desire to be limited to the use of aluminum but may use any metal having high heat conductivity. The outer peripheral portion of plate 27 is return bent over the outwardly extending flange 31 of the lower plate 25, so that when the flange of upper plate 27 has been return bent over flange 31 a substantially fixed position of all of the parts of the heating unit with regard to each other is effected. I prefer to use metal having high thermal reluctance, such as stainless steel, for the lower plate 25.

Referring now to Figs. 3 and 4, I have there shown a slightly modified form of heating unit comprising a helically wound resistor strip 33 which is substantially the same as hereinbefore set forth for strip 17 of Fig. 1, the dimensions of which are such as to give the desired wattage input into the heating element. I provide a heat and electric-insulating block 35 upon which the helically wound resistor strip 33 is adapted to rest. Block 35 is adapted to rest upon a dish-shaped member 37 having an outwardly extending flange 39 therearound.

A top or cover plate 41 may be made of aluminum and have a thickness on the order of .06" and be provided with upwardly projecting portions 43, which raised portions are of appreciable width and extend across the surface of plate 41 substantially as shown in Fig. 4 of the drawings. While the top plate 41 is preferably made of a metal of high heat conductivity the lower metal plate is preferably made of low heat conductivity, such as stainless steel.

Referring now to Figs. 5 and 6 of the drawings, I have there shown a still further modification of the device shown in Fig. 3 and comprising a resistor conductor strip 33 which is substantially the same as hereinbefore set forth for strip 17 of Fig. 1. Strip 33 is adapted to rest upon a block 47 of a solid and substantially unbreakable heat-insulating as well as electric-insulating material, for instance, Micalex or asbestos lumber.

A top plate 49 which may be made of sheet steel or of aluminum and which may have a thickness on the order of .06" is provided with a plurality of raised portions 51 which are concentric to each other and which extend all the way around the plate 49. Plate 49 is provided with depending and inwardly bent portions 53 which are bent over against the lower surface of block 47. The heating unit is adapted to rest upon a solid annular member 15 of heat insulation such as asbestos lumber to separate it from direct engagement with the range 11.

Referring now to Fig. 7 of the drawings, I have there shown a still further modification comprising a resistance conductor 33 which may be made of any of the usual resistance materials now in use or of aluminum, the thickness as well as the width of the strip 33 being such as to provide the proper resistance to obtain the desired watt input into the heating element.

The top plate 49 may be substantially the same as top plate 49 of Figs. 5 and 6 and a relatively thin sheet of aluminum 55 is positioned between the lower surface of plate 49 and the upper edge of strip 33. I prefer to make the sheet 55 of relatively thin aluminum, the thickness whereof is on the order of .015" and which has on both its upper and lower surface an anodic coating of the kind hereinbefore described in connection with strip 17 and plate 29. I may also provide an electric-insulating coating of the kind hereinabove described on the under-surface of plate 49.

Referring now to Figs. 8 and 9, I have there shown a still further modification of heating unit embodying my invention which comprises a strip 33 of a suitable resistance material such as now used for resistors or of aluminum. The entire outer surface of strip 33 which is wound to substantially helical shape is covered with an anodic coating of the kind hereinbefore set forth, particularly in regard to strip 17.

The strip 33 is adapted to rest upon a block 57 which is preferably made of either asbestos lumber or Micalex which are both heat- as well as electric-insulating. An upper plate 59 having a thickness on the order of .06" and being preferably made of aluminum and provided with a plurality of upstanding conical projections 61 thereon is separated from the upper edge of resistor strip 33 by a plurality of relatively thin sheets 63 of aluminum, the thickness of each of the sheets 63 being on the order of .015" and having an electric-insulating coating on both surfaces thereof so that the breakdown voltage will be twice that existing in the device shown in Figs. 1 and 7. A block 57 of electric- and heat-insulating material such as Micalex or asbestos lumber, is located below the resistor 33 and is held in proper operative position by return bent portions 60 of top plate 59.

Referring now to Fig. 10 of the drawings, I have there illustrated another modification of device embodying my invention in which a resistor strip 33 wound to helical shape has dimensions as to its width as well as to its thickness and to the number of turns provided so as to give a desired watt input.

An upper plate 65 which is preferably made of aluminum having a thickness on the order of .06" is spaced from the upper edges of the strip 33 by a relatively thin plate 67 of aluminum having a thickness on the order of .015". Both the inner surface of the plate 65 as well as the entire outer surface of the plate 67 are provided with an electric-insulating coating of the kind hereinbefore set forth in connection with resistor member 17 as well as the other relatively thin aluminum sheets.

A lower metallic supporting plate 69 of a metal like stainless steel is adapted to support a block 71 of heat- and electric-insulation, such as Micalex or asbestos lumber. I provide further two relatively thin sheets 73 of aluminum, each preferably having a thickness on the order of .015" and the entire surface of each of said plates being covered by a coating of the kind hereinbefore set forth in connection with resistor strip 17 and plate 29. The outer peripheral portion of plate 65 is then bent downwardly and then inwardly so as to clamp tightly the outer peripheral portion of the lower plate 69 against heat-insulating metal annulus 75 which is preferably made of stainless steel.

Referring now to Fig. 11 I have there shown a still further modification of an electric heating unit embodying my invention, which is substantially the same as Fig. 1. I provide a relatively thin strip of aluminum 77 between adjacent turns of the resistor member 17 and wind the resistor strip so that the adjacent turns of the resistor strip 17 and the intermediate strip 77 shall be in tight engagement with each other. The strip 77 has a thickness on the order of .015" and has its entire outer surface covered with an integral, inorganic, heat-conducting, high-temperature-resisting and electric-insulating coating of the same kind as hereinbefore set forth in connection with resistor strip 17.

By reason of the use of relatively thin metallic members of aluminum having an electric-insulating, heat-conducting coating thereon having a thickness either less than .001" or on the order of .001" as well as the use of such a coating on the metallic resistor strip, the temperature differential between the inherent temperature of the resistor strip and the temperature at the outside of the cover member is on the order of 400° F., in all of the different modifications shown.

One of the main objects in stove or range heating units is to prevent the downward flow of heat as much as possible and to conduct it upwardly toward a pot, pan, or skillet, placed upon the said heating element. The use of heat-insulating blocks of material below the heating elements and the use of preferably aluminum top sheets as well as of relatively thin sheets of aluminum between the resistor and the top sheet tends to provide a very good heat flow path having a relatively low thermal reluctance.

The use of the raised portions 43 and 51 in Figs. 3 to 6 inclusive, while apparently reducing the amount of surface of the heating unit which can be in engagement with the pot, pan, or skillet, does not in fact have the tendency to reduce the amount of heat transferred to the pot, pan or skillet. The use of stainless steel in certain of the heating units hereinbefore described in combination with the heat-insulating blocks, tends to reduce the downward heat flow from the resistor strip.

Various modifications may be made in the device embodying my invention without departing from the spirit and scope thereof and all such modifications coming clearly within the appended claim shall be considered as part of my invention.

I claim as my invention:

An electric heating unit comprising a heat-transmitting laminated plate including an outer metallic plate and an inner heat conducting spacer of thin sheet metal engaging the under side of the outer plate, a heating resistor formed of a metallic resistance strip wound in spiral convolutions, said strip and said spacer each having an integral anodic coating, the upper edges of the convolutions of said strip being in contact with said spacer and being in thermal contacting and electrically insulated relation with said spacer and outer metallic plate through said anodic coating, a heat-insulating backing member underlying and supporting the lower edges of the convolutions of said strip and means securing said backing member in clamping relation with said outer plate so as to maintain the upper edges of said strip, said spacer and said outer plate in thermal conducting contact.

CLARK M. OSTERHELD.

REFERENCES CITED

The following references are of record in the file of this patent:

UNITED STATES PATENTS

| Number | Name | Date |
| --- | --- | --- |
| 1,930,880 | Lokke | Oct. 17, 1933 |
| 2,026,797 | Pierson | Jan. 7, 1936 |
| 2,114,883 | Nawo | Apr. 19, 1938 |
| 2,164,650 | Goldthwaite | July 4, 1939 |
| 2,357,906 | Osterheld | Sept. 12, 1944 |
| 2,360,263 | Osterheld | Oct. 10, 1944 |
| 2,364,996 | Osterheld | Dec. 12, 1944 |